(12) United States Patent  
McNamara et al.

(10) Patent No.: US 8,989,120 B2  
(45) Date of Patent: *Mar. 24, 2015

(54) SYSTEMS AND METHODS FOR FILE SHARING THROUGH MOBILE DEVICES

(71) Applicant: AT&T Mobility II LLC, Atlanta, GA (US)

(72) Inventors: Justin Michael McNamara, Dunwoody, GA (US); Jeffrey Clinton Mikan, Atlanta, GA (US); Carolyn Tuthill, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 154 days.

This patent is subject to a terminal disclaimer.

(21) Appl. No.: 13/653,220

(22) Filed: Oct. 16, 2012

(65) Prior Publication Data

US 2013/0136076 A1 May 30, 2013  
US 2014/0098749 A9 Apr. 10, 2014

Related U.S. Application Data

(63) Continuation of application No. 13/307,941, filed on Nov. 30, 2011, now Pat. No. 8,289,918, which is a continuation of application No. 11/583,053, filed on Oct. 19, 2006, now Pat. No. 8,090,366.

(51) Int. Cl.  
*H04W 4/00* (2009.01)

(52) U.S. Cl.  
USPC .......................................... 370/329; 370/328

(58) Field of Classification Search  
CPC ............ H04W 4/12; H04W 4/14; H04W 4/16  
USPC .................................................. 370/329, 328  
See application file for complete search history.

(56) References Cited

U.S. PATENT DOCUMENTS

| 6,243,749 B1 | 6/2001 | Sitaraman et al. |
| 6,608,832 B2 * | 8/2003 | Forslow ........................ 370/353 |
| 6,826,395 B2 | 11/2004 | Lee et al. |
| 6,910,074 B1 | 6/2005 | Amin et al. |
| 7,002,995 B2 | 2/2006 | Chow et al. |
| 7,107,045 B1 | 9/2006 | Knoop |
| 7,440,442 B2 | 10/2008 | Grabelsky et al. |
| 7,599,355 B2 * | 10/2009 | Sunstrum ....................... 370/352 |
| 7,685,293 B2 * | 3/2010 | Deshpande et al. .......... 709/227 |

(Continued)

FOREIGN PATENT DOCUMENTS

WO   WO2006059353   *   6/2006

OTHER PUBLICATIONS

International Search Report and Written Opinion dated Apr. 3, 2008 in International Application No. PCT/US2007/081106.

(Continued)

*Primary Examiner* — Ricky Ngo  
*Assistant Examiner* — Dewanda Samuel  
(74) *Attorney, Agent, or Firm* — Hartman & Citrin LLC

(57) ABSTRACT

Systems and methods are disclosed which relate to the sending and receiving of multimedia files between two devices while connected through a voice call. These devices are free to send any type of file through a direct connection without the need to hang up and call back just to see if the file was sent successfully. These methods work for a plurality of cellular and computer devices connected through a cellular network or other Internet Service Provider.

10 Claims, 2 Drawing Sheets

(56) References Cited

U.S. PATENT DOCUMENTS

| | | | |
|---|---|---|---|
| 8,090,366 B2 | 1/2012 | McNamara et al. | |
| 8,123,461 B2 * | 2/2012 | Yoshida et al. | 415/68 |
| 8,145,722 B2 * | 3/2012 | Koons et al. | 709/206 |
| 2002/0034166 A1 | 3/2002 | Barany et al. | |
| 2002/0082001 A1 | 6/2002 | Tanaka et al. | |
| 2004/0022237 A1 | 2/2004 | Elliott et al. | |
| 2004/0085949 A1 | 5/2004 | Partanen et al. | |
| 2004/0203752 A1 | 10/2004 | Wojaczynski et al. | |
| 2005/0048958 A1 | 3/2005 | Mousseau et al. | |
| 2005/0064853 A1 | 3/2005 | Radpour | |
| 2005/0143053 A1 | 6/2005 | Virtanen et al. | |
| 2005/0286466 A1 | 12/2005 | Tagg et al. | |
| 2006/0034195 A1 * | 2/2006 | Blaiotta et al. | 370/261 |
| 2006/0165060 A1 | 7/2006 | Dua | |
| 2006/0221939 A1 | 10/2006 | Rosen et al. | |
| 2007/0002840 A1 * | 1/2007 | Song et al. | 370/352 |
| 2007/0002844 A1 | 1/2007 | Ali | |
| 2007/0036143 A1 | 2/2007 | Alt et al. | |
| 2007/0053370 A1 | 3/2007 | Aghvami et al. | |
| 2007/0071006 A1 | 3/2007 | Bosch et al. | |
| 2007/0112962 A1 | 5/2007 | Lewontin | |
| 2007/0207782 A1 | 9/2007 | Tran | |
| 2007/0280154 A1 | 12/2007 | Gupta et al. | |
| 2008/0026732 A1 | 1/2008 | Goldfarb | |
| 2008/0267166 A1 | 10/2008 | Peisa et al. | |
| 2010/0241711 A1 | 9/2010 | Ansari et al. | |

OTHER PUBLICATIONS

U.S. Office Action dated Nov. 6, 2008 in U.S. Appl. No. 11/583,053.
U.S. Office Action dated May 22, 2009 in U.S. Appl. No. 11/583,053.
U.S. Office Action dated Nov. 9, 2009 in U.S. Appl. No. 11/583,053.
U.S. Office Action dated Apr. 30, 2010 in U.S. Appl. No. 11/583,053.
U.S. Office Action dated Nov. 10, 2010 in U.S. Appl. No. 11/583,053.
U.S. Office Action dated Apr. 21, 2011 in U.S. Appl. No. 11/583,053.
U.S. Notice of Allowance dated Sep. 12, 2011 in U.S. Appl. No. 11/583,053.
U.S. Office Action dated Mar. 2, 2012 in U.S. Appl. No. 13/307,941.
U.S. Notice of Allowance dated Jun. 12, 2012 in U.S. Appl. No. 13/307,941.

\* cited by examiner

SYSTEMS AND METHODS FOR FILE SHARING THROUGH MOBILE DEVICES

This application is a continuation of U.S. patent application Ser. No. 13/307,941, filed Nov. 30, 2011, now U.S. Pat. No. 8,289,918; which is a continuation of U.S. patent application Ser. No. 11/583,053, filed Oct. 19, 2006, now U.S. Pat. No. 8,090,366, the contents of which are hereby incorporated by reference herein in their entirety into this disclosure.

BACKGROUND OF THE INVENTION

1. Field of the Invention

The present invention relates to telecommunications. More specifically, the present invention relates to the transfer of multimedia files between two or more devices during a voice call without the need to hang up and call back, via various methods, including connecting multiple cellular devices, a cellular device and a computer, multiple computers, or any other combination of electronic devices having a connection with the internet.

2. Background of the Invention

Cellular communication is an area of increasing technology and availability. At the end of 2005, a CTIA study showed that 69% of the United States population subscribed to a cellular telephone service. Cellular telephones work on a network of receiving towers that communicate with a central location. These towers are constantly being built in an effort to create a seamless network across the globe. Not only is this market more popular, but the technology is growing. Cellular companies have now opened data pipelines for delivering broadband internet straight to its customer's phones.

As this integration between mobile services and internet services develops, there are many applications that can benefit from the coupling of this trend with increasingly powerful and multi-functional mobile devices. Besides voice audio, the existing infrastructure permits transfer of audio, video, and other multimedia across cellular networks. Uses of this facility could range from transmitting personal photographs between users to sending live video or location information to an E911 operator.

As phones become more like computers, users want to exchange more than mere conversations. Most new mobile phones are capable of performing many functions beyond basic telephony. Today's typical mobile phone is a fusion of a digital camera or camcorder, PDA, and digital music player, with room for add-ons like USB, Firewire, IR, or BLUETOOTH which gives them the ability to communicate with other devices independent of the cellular network. However, these phones are still essentially communication devices. It's not difficult to combine a digital camera with a music player, but mobile phone manufacturers have stepped up to the additional challenge of being able to integrate this functionality with the need to send and receive voice calls on demand.

The next step is to fuse these functions to communicate more than just voice. There exists a lot of potential for new technology and function with an IP-enabled cellular network, which essentially assigns each cellular device an IP address just like a home computer when connected to the internet. This allows communication of pictures, film, and other data objects with any other device on the internet, including a home computer, thereby exploiting the functionality of the phone/camera/mp3 player. There exists an infrastructure that utilizes the availability of fast data-transfer protocols, standardized technologies, and increasingly powerful wireless devices. It receives large amounts of investment by cellular operators in ensuring that their networks can implement these technologies.

It is the IP-Multimedia System, or IMS, which is essentially a system by which mobile operators can offer and charge for discrete services, that are usually available on the internet, alongside currently offered services. This architecture works with any packet-switching network, and is IP-based. Therefore it has tremendous potential for services like Voice-over IP (VoIP), push-to-talk, videoconferencing, IM, presence information, etc. An example of a standardized signaling protocol is the Session Initiation Protocol, or SIP. SIP allows two devices in a network to find each other and open lines of communication easily, and is a significant part of IMS.

However, this existing infrastructure is not being utilized to its fullest potential. Currently, to send multimedia files to another mobile user, one is limited to either using the Multimedia Message Service (MMS), email, or via an instant messaging (IM) program that traverses the IM service provider network. MMS has its share of inconveniences. It cannot be used during a voice call, and MMS technology is fairly proprietary and non-scaleable. Also, the message has to traverse an MMS Center which is a temporary storage center for the message. The message is held there until the receiving device is located. The MMS Center will only hold the message for so long, and it can be unreliable. Email has some disadvantages as well. Though it has been the default option for sending files across the internet, most phones have limited email capabilities, and cannot access internet mail while engaged in a voice call. Sending files over instant messaging is even more burdensome. Both mobile devices must be capable of running IM software, the software must run on the same IM protocol, and the software must have capability of sending and receiving files. Of the popular IM software programs that exist on mobile devices, most of the programs do not support file transfer.

What is needed is a method that allows multimedia files to be transferred from one user to another in the midst of a voice call between the two users. The current state of technology forces a user to hang up, send a multimedia file through one of the above mentioned services, like MMS, then call back to see if the transfer was successful. Even if it was successful the transfer might not be instantaneous, requiring both users to pause for an unknown amount of time to allow the MMS Center, email server, or IM server to forward the multimedia file. Although it works, efficiency is the main purpose of having this capability on one's phone. Most people would rather send the files through their home computer, and know they will reach their destination soon, than try to send the file through their mobile device.

Ideally, this process would involve minimal work on the user's part, allowing software to take care of all the technical negotiations, and efficient employment of the existing infrastructure. When connected to a user in a voice call, the user should not need to know the IP address of the connected device. These devices are already connected via voice, and software should be able to find the IP address without user intervention.

SUMMARY OF THE INVENTION

The present invention is such a technique of transferring multimedia files from one user to another in the midst of a voice call. While users are connected in the voice call, one user can select on his mobile device to make a direct connection to the other user in order to send a multimedia file to the other user during the call. That user can either accept or reject this offer to make a direct connection by making that selection on her mobile device. If she accepts, the direct connection is opened and these users can send any file to the other, whether it be a picture, sound, movie, or data file, all while still talking through the mobile devices.

Furthermore, the present invention works with the forms of communication that network carriers currently have, such as GSM, CDMA, and TDMA networks, and others. This also allows mobile devices to connect to other devices on the internet that may not be cellular telephones, like computers or PDA's. The direct connection utilized between the two connecting devices can be secured as well using any of the current forms of encryption.

In one embodiment of the present invention, two users with cellular telephones on a GSM/GPRS network can send multimedia files to each other while connected in a voice call. So if a proud father is talking to his mother and really wants to send pictures of his new baby to her, he can do so while he is on the phone. The father just establishes a direct connection, and he can then send any multimedia file he wants without having to hang up and call back to make sure the files were received correctly.

In another embodiment of the present invention, one user with a cellular telephone on a GSM/GPRS network connects to a computer over the internet using Voice-Over IP or VOIP. This expands the usability of the previous embodiment because both users do not need cellular telephones to make a direct connection. Since the cellular telephone has IMS capability, it easily obtains an IP address that can be seen and used to communicate with by any computer or other device on the internet. This setup works in substantially the same way. Tom calls his mother from his VOIP phone to her cellular telephone and wants to send her pictures of his new baby. He establishes a direct connection in the background and sends over all the pictures he wants while still talking to his mother.

DETAILED DESCRIPTION OF THE INVENTION

Figure 1:
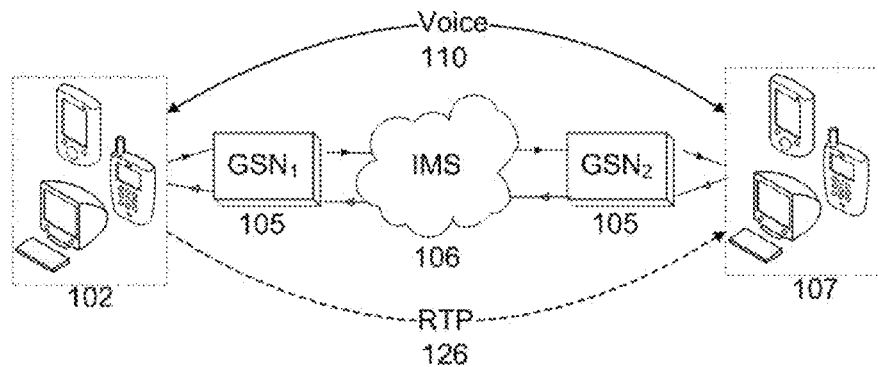
FIG. 1 shows an overview of the flow of data between two devices connected through both a voice connection and a file transfer session according to an exemplary embodiment of the present invention.

The present invention is a technique of sharing files with the person or device that one is connected to in a voice call as shown in FIG. 1. This is accomplished by establishing a direct IP connection between the two devices 102, 107 that are connected in a voice call 110 without the need for either device to hang up. Once a direct IP connection 126 is established, the users can send files back and forth to each other, such as pictures, sound clips, music, video, or any other file. One such method of making the direct IP connection possible is through the IP Multimedia Subsystem or IMS 106.

IMS 106 is a system by which mobile operators can offer discrete services, usually available on the internet, alongside currently offered services. These services can include music, games, picture downloads, direct multimedia sessions, text messaging, or direct voice connections. An IMS enabled cellular telephone 102 can be assigned an IP address, which other devices on the internet 107 can use to connect to the cellular telephone through gateways 105. These other devices 107 can be computers, servers, other IMS enabled cellular telephones, or many others. This means a multimedia session between two IMS users, between an IMS user and a user on the Internet, and between two users on the Internet is established using the same protocol.

Figure 2:
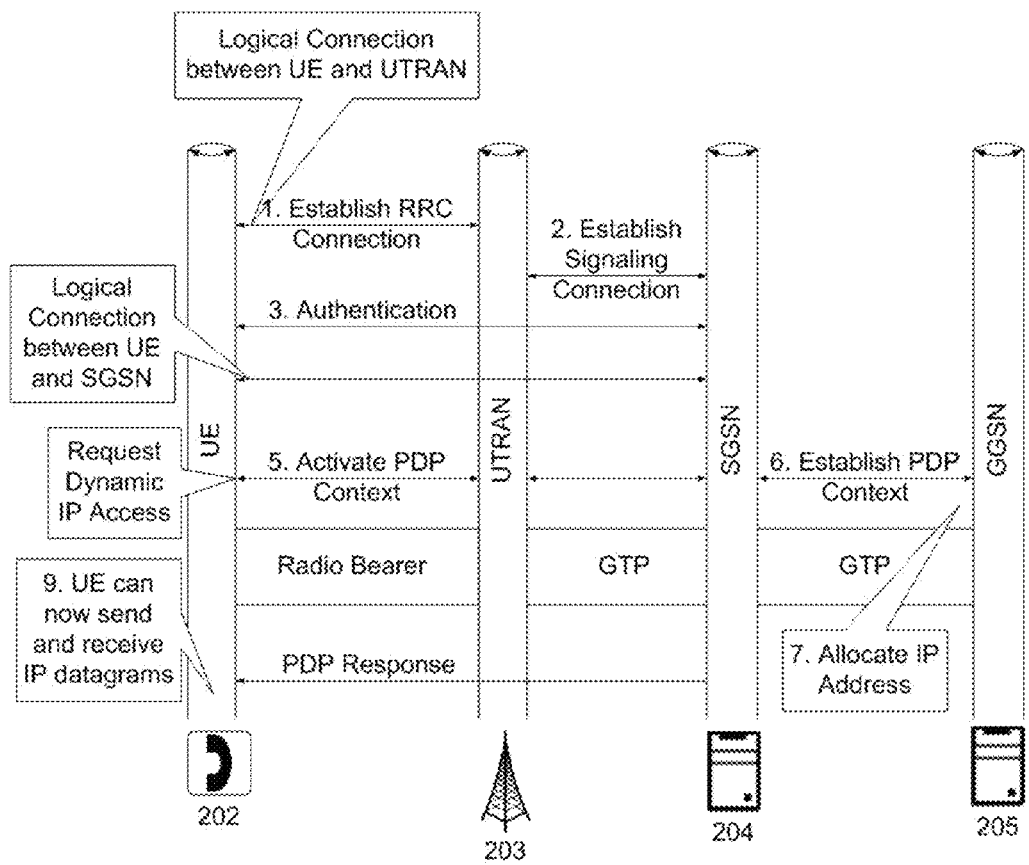
FIG. 2 shows the steps to obtaining an IP address for a cellular telephone connecting to IMS according to an exemplary embodiment of the present invention.

The registration of a cellular telephone with IMS to receive an IP address is shown in FIG. 2. The user's device, or User Equipment, UE 202, receives its IP address from IMS upon request. From a cellular telephone, this request is first sent from the UE 202 to the nearest tower 203. The tower 203 then relays the request to a server 204. The server 204 then makes a connection with the UE 202 where it obtains authentication. Once authenticated, the UE 202 then tries to open a Packet Delivery Protocol, or PDP, connection to the internet to receive an IP address. This request is relayed from the tower 203 to the server 204 and then to a gateway 205, where the PDP packet is sent to the internet. The internet allocates an IP address and relays that address back through the gateway 205, server 204, and tower 203. The PDP response is received by the UE 202, which then allows it to send and receive IP datagrams. An IP datagram is a packet of information, which gets translated into a PDP by the gateway 205 before reaching the UE 202.

Prior to the voice call, both of the UE's 202 are either SIP capable or IMS capable, which means they register to an IMS network and are given an IP address. After registration, the UE's 202 should be able to perform SIP based calls to each other and communicate with each other using their SIP addresses.

Figure 3:
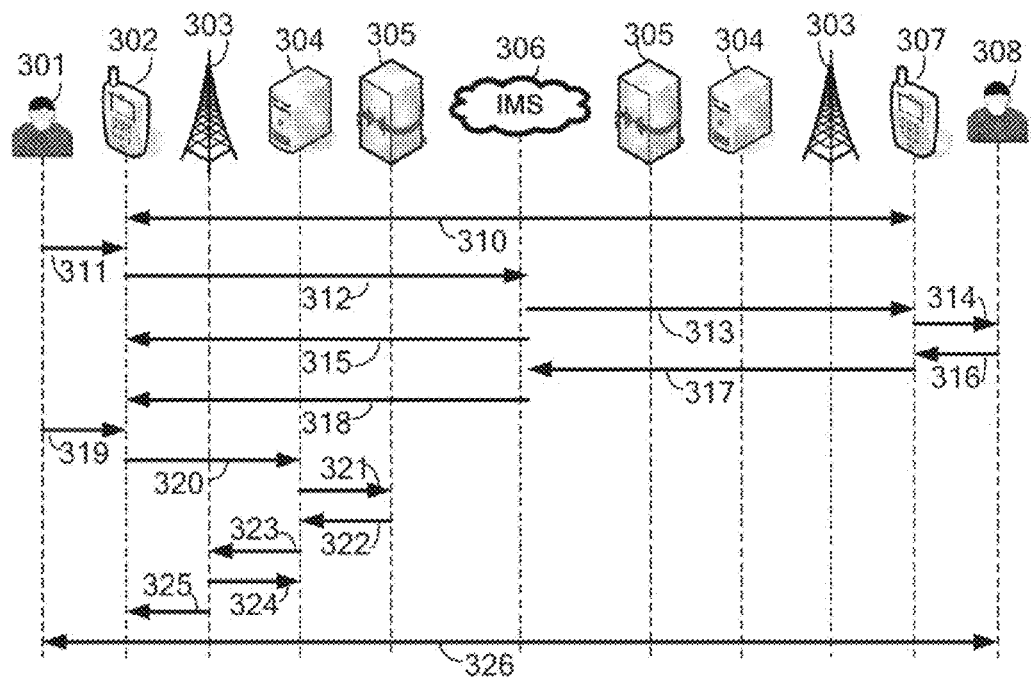
FIG. 3 shows the steps to establishing a direct PDP connection over a cellular network during a voice call according to an exemplary embodiment of the present invention.

The process of setting up the direct connection 326 is illustrated in FIG. 3. First, a voice call 310 is initiated between User A 301 and User B 308. Accompanying the request to set up the voice call 310 can be a request to check the parameters of each of the UE's 302, 307 to determine if they are capable of transferring data between the two. The instruction request 310 would be a request for a voice call and content call request.

Once the voice call 310 is setup, a SIP invitation 312 is sent from User A's UE 302 to User B's UE 307 inviting User B 308 to the IP address of User A's UE 302. User B 308 receives the request in the background, because there is no reason to have guaranteed bandwidth dedicated to it. The invitation 312 travels from User A's UE 302 to the nearest tower 303 where it is relayed to a server 304. The server 304 then relays the invitation through a gateway 305 where it is translated into an IP datagram, a form IMS 306 can understand. Once it has been translated IMS 306 finds the IP address of User B's UE 307. If IMS 306 is successful in finding the IP address of User B's UE 307 it sends a message 315 to User A's UE 302 immediately telling User A 301 that IMS is trying to connect to User B 308.

The invitation is relayed back through the gateway 305, server 304, and tower 303 nearest User B's UE 307 and User B 308 receives the invitation 314 with an option to accept or decline. If User B 308 declines, then the direct connection 326 is dropped but the voice call 310 still continues. If User B 308 accepts, then an acceptance message 317, 318 is sent back through the system to User A's UE 302. This acceptance message 317, 318 not only sends simply the message of acceptance but also tells User A's UE 302 what type(s) of media it is capable of receiving, such as video, audio, or pictures. The acceptance message 317, 318 is followed by a handshake between the two UE's 302, 307 over a primary PDP connection.

When User A 301 is ready to send a file, User A 301 selects a file to send from a menu on the device 319. A message is sent to User B's UE 307 where User B 308 can either accept or reject the file. If User B 308 accepts, then a secondary PDP connection is established to send the media through a dedicated Quality of Service or QoS 320. User A's UE 302 sends a message to User B's UE 307 opening the secondary PDP connection for file transfer. User B's UE 307 negotiates with User A's UE 302 to find an acceptable speed of transfer and packet size. This is normally the fastest speed the devices can handle in their current location subject to provider limitations, such as the data plan User B 308 pays for. After this negotiation 321, 322 is complete the file is sent through and is received on User B's UE 307. Once the transfer is completed, the secondary PDP connection is dropped. These steps are repeated, starting with the file selection, for each file User A 301 wishes to send. User B 308 may select and send any file as well using the same steps as User A 301.

While transferring files, a user may need to send a sensitive file. If this is the case the user has the option of sending the file over a secure connection. User A 301 would simply select another option from his device to secure the connection for this or any number of files. As the file is transferred it will be encrypted on User A's UE 302 and decrypted on User B's UE 307. Their UE's 302, 307 can be equipped with any of the many forms of encryption that exist.

Figure 4:
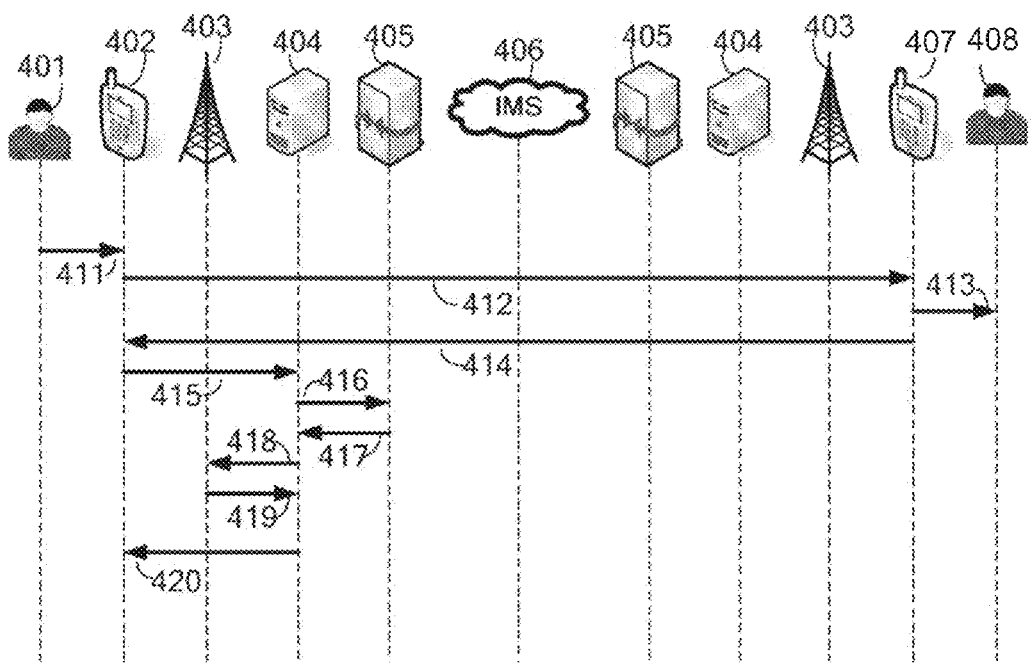
FIG. 4 shows the steps to disconnecting the direct connection over a cellular network during a voice call according to an exemplary embodiment of the present invention.

Once all the file transfers have completed, the session can be released, as shown in FIG. 4. User A 401 selects to release the session from a menu on the device 411. A message 412 is sent from User A's UE 402 to User B's UE 407 either asking for a release in the session, or forcing a release in the session. If User B 408 accepts the release, a message 414 is sent back to User A's UE 402 to close the connection. If the release is accepted or forced, User A's UE 402 closes the connection 415 with the server 404 immediately. User B 408 can request or force a session release as well using the same steps as User A 401.

This technique works for many cellular networks, and has many applications. Once such embodiment of this invention is a cellular telephone on a GSM/GPRS network connecting to another cellular telephone on a GSM/GPRS network. GSM stands for Global Standard for Mobile Communication, and is the technology behind many mobile carriers today. GPRS stands for General Packet Radio Service, and is the standard for sending data in packets across the GSM network, allowing multiple users to send data using the same channel.

The cellular telephones connect in a voice call over the GSM network. Once established, the first user pushes the keys on his cellular telephone to send a request to the other user to initiate the file sharing session. This request is sent through the tower to a GPRS server known as a Serving GPRS Support Node or SGSN. From the SGSN the request is relayed through a GPRS gateway known as a Gateway GPRS Support Node or GGSN. Once the request is received by the other user's cellular telephone, she can opt to accept it or reject it. If accepted, the cellular telephones attempt to connect to each other using the GPRS Tunneling Protocol or GTP, the defining IP protocol for the GPRS system. GTP is used for the primary PDP connection, which is the basic constant connection for sending requests and the secondary PDP connection, which opens once a file starts transferring.

Another embodiment of the present invention is a cellular telephone on a GSM/GPRS network connecting to a personal computer using a VoIP connection. The first user's cellular telephone is connected over the GSM network which is translated through a gateway to the second user's Internet Service Provider, which then relays the signal to the IP address of the second user's personal computer. The first user or the second user can initiate the file transfer session by simply pressing a key or pattern of keys. The first user's cellular telephone has already registered with IMS and has been given an IP address. The cellular telephone and personal computer can use each other's IP addresses to find each other over the internet and establish a primary direct connection. Once established, the users are free to send multimedia files to each other using a secondary connection while still talking.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A receiving device, comprising:
a processor; and
a memory storing instructions that, when executed by the processor, cause the processor to perform operations comprising
receiving a first invitation to initiate a voice call with a transmitting device, the first invitation comprising a request to check a plurality of parameters of the receiving device,
upon the voice call between the transmitting device and the receiving device being initiated, receiving, from the transmitting device, a second invitation to initiate a primary data connection between the transmitting device and the receiving device, the second invitation comprising a first internet protocol address of the transmitting device,
transmitting, to the transmitting device, an acceptance message accepting the second invitation, the acceptance message comprising the plurality of parameters associated with the receiving device, the plurality of parameters comprising types of media the receiving device is capable of receiving, and the acceptance message accepting the second invitation triggering a handshake between the transmitting device and the receiving device over the primary data connection,
receiving, from the transmitting device, a first message comprising a request for the receiving device to accept a media file from the transmitting device, in response to accepting the request for the receiving device to accept the media file, receiving, from the transmitting device, a second message establishing a secondary data connection between the transmitting device and the receiving device, and receiving, from the transmitting device over the secondary data connection using a packet-delivery protocol while the receiving device and the transmitting device are engaged in the voice call, the media file comprising at least one of a video, an audio, or a picture, wherein the primary data connection between the transmitting device and the receiving device is for sending requests and the secondary data connection between the transmitting device and the receiving device is for transferring files.

2. The receiving device of claim 1, wherein the voice call is enabled by a cellular transceiver in communication with the processor.

3. The receiving device of claim 2, wherein the cellular transceiver enables communication with one or more of a global system for mobile communications network, a code division multiple access network, a time division multiple access network, a Wi-Fi network, a WiMax network, a cable network, a digital subscriber line network, and a plain old telephone system network.

4. The receiving device of claim 1, wherein the transmitting device is allocated the first internet protocol address and the receiving device is allocated a second internet protocol address.

5. The receiving device of claim 1, wherein the primary data connection uses a session initiation protocol to send and receive a file sharing request.

6. A method comprising:
receiving, by a receiving device, a first invitation to initiate a voice call with a transmitting device, the first invitation comprising a request to check a plurality of parameters of the receiving device;

upon the voice call between the transmitting device and the receiving device being initiated, receiving, by the receiving device from the transmitting device, a second invitation to initiate a primary data connection between the transmitting device and the receiving device, the second invitation comprising a first internet protocol address of the transmitting device;

transmitting, from the receiving device to the transmitting device, an acceptance message accepting the second invitation, the acceptance message comprising the plurality of parameters associated with the receiving device, the plurality of parameters comprising types of media the receiving device is capable of receiving, and the acceptance message accepting the second invitation triggering a handshake between the transmitting device and the receiving device over the primary data connection;

receiving, by the receiving device from the transmitting device, a first message comprising a request for the receiving device to accept a media file from the transmitting device;

in response to accepting the request for the receiving device to accept the media file, receiving, by the receiving device from the transmitting device, a second message establishing a secondary data connection between the transmitting device and the receiving device; and receiving, by the receiving device from the transmitting device over the secondary data connection using a packet-delivery protocol while the receiving device and the transmitting device are engaged in the voice call, the media file comprising at least one of a video, an audio, or a picture, wherein the primary data connection between the transmitting device and the receiving device is for sending requests and the secondary data connection between the transmitting device and the receiving device is for transferring files.

7. The method of claim 6, wherein the voice call is enabled by a cellular transceiver of the receiving device.

8. The method of claim 7, wherein the cellular transceiver enables communication with one or more of a global system for mobile communications network, a code division multiple access network, a time division multiple access network, a Wi-Fi network, a WiMax network, a cable network, a digital subscriber line network, and a plain old telephone system network.

9. The method of claim 6, wherein the transmitting device is allocated the first internet protocol address and the receiving device is allocated a second internet protocol address.

10. The method of claim 6, wherein the primary data connection uses a session initiation protocol to send and receive a file sharing request.

* * * * *